(12) United States Patent
Hatfield

(10) Patent No.: US 10,265,684 B2
(45) Date of Patent: Apr. 23, 2019

(54) HIGHLY ACTIVE AND THERMALLY STABLE COATED GASOLINE PARTICULATE FILTERS

(71) Applicant: Clean Diesel Technologies, Inc., Oxnard, CA (US)

(72) Inventor: Randal L. Hatfield, Port Hueneme, CA (US)

(73) Assignee: CDTI ADVANCED MATERIALS, INC., Oxnard, CA (US)

(*) Notice: Subject to any disclaimer, the term of this patent is extended or adjusted under 35 U.S.C. 154(b) by 236 days.

(21) Appl. No.: 15/586,394

(22) Filed: May 4, 2017

(65) Prior Publication Data
US 2018/0318804 A1 Nov. 8, 2018

(51) Int. Cl.
| | | |
|---|---|---|
| *B01J 23/89* | (2006.01) | |
| *B01J 35/00* | (2006.01) | |
| *B01J 35/04* | (2006.01) | |
| *B01J 21/16* | (2006.01) | |
| *B01J 37/02* | (2006.01) | |
| *F01N 3/10* | (2006.01) | |
| *F01N 3/035* | (2006.01) | |
| *B01D 53/94* | (2006.01) | |
| *F01N 3/022* | (2006.01) | |

(52) U.S. Cl.
CPC .......... *B01J 23/894* (2013.01); *B01D 53/945* (2013.01); *B01D 53/9477* (2013.01); *B01J 21/16* (2013.01); *B01J 23/892* (2013.01); *B01J 23/8906* (2013.01); *B01J 35/0006* (2013.01); *B01J 35/04* (2013.01); *B01J 37/0201* (2013.01); *F01N 3/0222* (2013.01); *F01N 3/035* (2013.01); *F01N 3/101* (2013.01); *B01D 2255/1025* (2013.01); *B01D 2255/2065* (2013.01); *B01D 2255/20738* (2013.01); *B01D 2255/40* (2013.01); *B01D 2255/908* (2013.01); *B01D 2255/915* (2013.01); *B01D 2258/014* (2013.01); *F01N 2370/02* (2013.01)

(58) Field of Classification Search
CPC .... B01J 23/892; B01J 23/8906; B01J 35/006; B01J 35/04; B01D 2258/014; B01D 53/945; B01D 2255/1025; B01D 2255/2065; B01D 2255/20738; B01D 2255/40; B01D 2255/908; B01D 2255/915; B01D 2255/9155; F01N 3/035; F01N 3/10; F01N 3/101
See application file for complete search history.

(56) References Cited

U.S. PATENT DOCUMENTS

| | | |
|---|---|---|
| 4,629,472 A | 12/1986 | Haney, III et al. |
| 4,891,050 A | 1/1990 | Bowers et al. |
| 4,892,562 A | 1/1990 | Bowers et al. |
| 5,034,020 A | 7/1991 | Epperly et al. |
| 5,168,836 A | 12/1992 | Kraus |
| 5,203,166 A | 4/1993 | Miller |
| 5,266,083 A | 11/1993 | Peter-Hoblyn et al. |
| 5,404,841 A | 4/1995 | Valentine |
| 5,501,714 A | 3/1996 | Valentine et al. |
| 5,535,708 A | 7/1996 | Valentine |
| 5,584,894 A | 12/1996 | Peter-Hoblyn et al. |
| 5,693,106 A | 12/1997 | Peter-Hoblyn et al. |
| 5,732,548 A | 3/1998 | Peter-Hoblyn et al. |
| 5,743,922 A | 4/1998 | Peter-Hoblyn et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |

(Continued)

FOREIGN PATENT DOCUMENTS

| | | |
|---|---|---|
| EP | 2650042 | 10/2013 |
| WO | WO 90/07561 | 7/1990 |

(Continued)

OTHER PUBLICATIONS

Morgan et al., *Platinum Group Metal and Washcoat Chemistry Effects on Coated Gasoline Particulate Filter Design*, Johnson Matthey Technology Review, vol. 59 (2015) 188-192.
Pan, C. et al., *Overall Water Splitting on the Transition-Metal Oxynitride Photocatalyst $LaMg_{1/3}Ta_{2/3}O_2N$ over a Large Portion of the Visible-Light Spectrum*, Chemistry European Journal, (Jan. 2016) 8 pages.
Richter, J. et al., *Application of Catalyzed Gasoline Particulate Filters to GDI Vehicles*, SAE International, vol. 5, Iss. 3 (Aug. 2012) 1361-1370.

(Continued)

*Primary Examiner* — Timothy C Vanoy
(74) *Attorney, Agent, or Firm* — Thaddius J. Carvis

(57) ABSTRACT

Coated gasoline particulate filters (cGPFs) that are produced according to varied material compositions and catalyst configurations are disclosed. The cGPFs include Fe—Ce (rich)-activated Rh compositions that provide greater catalytic functionality. These cGPFs are incorporated within engine systems as components of TWC systems for controlling and reducing engine exhaust emissions. The conversion performance of these TWC systems is assessed and compared employing worldwide harmonized light duty test cycle (WLTC) protocol within a gasoline fueled internal combustion engine. These TWC systems exhibit a significant catalytic performance when compared with the catalytic performance of a PGM-based Original Equipment Manufacturer (OEM) catalyst employed in TWC applications. Further, TWC catalysts are produced including Fe-activated Rh layers comprising dopant elements. The catalytic performance of the TWC catalysts is evaluated by performing light-off and standard isothermal oxygen storage capacity oscillating tests. The TWC catalysts exhibit improved catalytic performance and significant oxygen storage capacity.

25 Claims, 6 Drawing Sheets

(56) References Cited

U.S. PATENT DOCUMENTS

| | | |
|---|---|---|
| 5,868,421 A | 2/1999 | Eyrainer |
| 5,921,080 A | 7/1999 | Ulmet et al. |
| 5,924,280 A | 7/1999 | Tarabulski |
| 5,939,354 A | 8/1999 | Golden |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,203,770 B1 | 3/2001 | Peter-Hoblyn et al. |
| 6,279,603 B1 | 8/2001 | Czarnik et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,531,425 B2 | 3/2003 | Golden |
| 6,948,926 B2 | 9/2005 | Valentine et al. |
| 7,014,825 B2 | 3/2006 | Golden |
| 7,473,288 B2 | 1/2009 | Toyoda et al. |
| 7,527,776 B2 | 5/2009 | Golden et al. |
| 7,641,875 B1 | 1/2010 | Golden |
| 8,323,601 B2 | 12/2012 | Justic et al. |
| 8,802,582 B2 | 8/2014 | Malyala et al. |
| 8,815,189 B2 * | 8/2014 | Arnold ............... B01D 46/2429 423/213.2 |
| 8,845,987 B1 | 9/2014 | Nazarpoor et al. |
| 8,853,121 B1 | 10/2014 | Nazarpoor et al. |
| 9,216,410 B2 | 12/2015 | Hatfield |
| 9,475,004 B2 * | 10/2016 | Hatfield ............... B01D 53/945 |
| 9,707,545 B2 * | 7/2017 | Felix ..................... B01D 53/945 |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2004/0098905 A1 | 5/2004 | Valentine et al. |
| 2004/0172876 A1 | 9/2004 | Sprague et al. |
| 2005/0132674 A1 | 6/2005 | Toyoda et al. |
| 2005/0160663 A1 * | 7/2005 | Valentine ................ C10L 1/026 44/388 |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0217751 A1 | 10/2005 | Valentine et al. |
| 2006/0081922 A1 | 4/2006 | Golden |
| 2006/0120936 A1 | 6/2006 | Alive et al. |
| 2006/0166816 A1 | 7/2006 | Zhang et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2007/0015656 A1 | 1/2007 | Valentine et al. |
| 2007/0134145 A1 * | 6/2007 | Strehlau ............. B01D 53/9422 423/213.5 |
| 2007/0209272 A1 | 9/2007 | Valentine |
| 2007/0283681 A1 | 12/2007 | Makkee et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0304566 A1 | 12/2009 | Golden et al. |
| 2009/0324468 A1 | 12/2009 | Golden et al. |
| 2009/0324469 A1 | 12/2009 | Golden et al. |
| 2010/0240525 A1 | 9/2010 | Golden et al. |
| 2010/0316545 A1 | 12/2010 | Alive et al. |
| 2010/0316547 A1 | 12/2010 | Justic et al. |
| 2011/0239626 A1 | 10/2011 | Makkee et al. |
| 2012/0183447 A1 | 7/2012 | Kwan et al. |
| 2013/0115144 A1 | 5/2013 | Golden et al. |
| 2013/0236380 A1 | 9/2013 | Golden et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 * | 12/2015 | Hatfield ............... B01D 53/945 502/242 |
| 2015/0352532 A1 | 12/2015 | Hatfield et al. |
| 2015/0352533 A1 * | 12/2015 | Hatfield ............... B01D 53/945 502/304 |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 4/2016 | Nazarpoor et al. |
| 2016/0121308 A1 | 5/2016 | Nazarpoor et al. |

(56) References Cited

U.S. PATENT DOCUMENTS

| | | | |
|---|---|---|---|
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |
| 2017/0095794 A1 | 4/2017 | Nazarpoor et al. |
| 2017/0095800 A1 | 4/2017 | Nazarpoor et al. |

FOREIGN PATENT DOCUMENTS

| | | |
|---|---|---|
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |
| WO | WO 2016/203371 | 12/2016 |

OTHER PUBLICATIONS

*Umicore—Catalysed Gasoline Particulate Filter (cGPF)* [online] [retrieved Apr. 2, 2017]. Retrieved from the Internet: <URL: http://ac.umicore.com/en/technologies/gasoline-particulate-filter/>. 3 pages.

\* cited by examiner

HIGHLY ACTIVE AND THERMALLY STABLE COATED GASOLINE PARTICULATE FILTERS

BACKGROUND

Field of the Disclosure

The present disclosure relates generally to particulate filters, and more particularly to coated gasoline particulate filters (cGPFs), such as for use within engine exhaust aftertreatment systems.

Background Information

Particulate emissions for gasoline engines are subject to regulations, such as, for example the upcoming Euro 6 (2014) and China 6 (2016) standards. Existing aftertreatment systems currently in use in for gasoline engines are not suitable for achieving the proposed particulate matter standard. In contrast to particulates generated by diesel lean burning engines, the particulates generated by gasoline engines, such as gasoline fueled internal combustion engines, tend to be finer and in lesser quantities. This is due to the different combustion conditions occurring within a diesel engine as compared to within a gasoline engine. For example, gasoline engines run at a higher temperature than diesel engines. Also, hydrocarbon components are different in the emissions of gasoline engines as compared to diesel engines.

As particulate standards become more stringent, however, there is a need to provide particulate trapping functionality without unduly crowding the exhaust pipe and increasing back-pressure. Moreover, HC, $NO_X$, and CO conversions continue to be of interest. Certain filter technology has relatively small pores and/or smaller porosity that is intended to be used to capture fine particulate matter, but such filters generally cannot accommodate sufficient catalyst loading to meet HC, $NO_X$, and CO conversion requirements.

There is a continuing need to provide a particulate filter having sufficient TWC activity in conjunction with an efficient filter without unduly increasing back-pressure so that regulated HC, $NO_X$, and CO conversions can be achieved while meeting particulate matter emissions.

SUMMARY

The present disclosure describes coated gasoline particulate filters (cGPFs) that are produced according to varied catalyst configurations, which include Fe—Ce (rich)-activated Rh compositions. In some embodiments, the cGPFs include a substrate and an impregnation (IMP) layer. In an example, the substrate is implemented as a ceramic wall-flow filter substrate. In another example, the substrate is implemented as a ceramic flow-through monolith substrate. In these embodiments, the cGPFs exhibit a minimum increase in back-pressure when compared to blank filter substrates.

In some embodiments, the IMP layer is implemented as a PGM composition in combination with iron (Fe) and cerium (Ce) loadings (rich in Ce side). In these embodiments, the PGM composition includes platinum (Pt), palladium (Pd), ruthenium (Ru), iridium (Ir), and rhodium (Rh), either by themselves, or in combinations thereof employing different loadings. In an example, the PGM composition includes Rh loadings within a range from about 1 g/ft$^3$ to about 100 g/ft$^3$. Further to these embodiments, Fe loadings range from about 200 g/ft$^3$ to about 1,680 g/ft$^3$. Still further to these embodiments, Ce loadings range from about 200 g/ft$^3$ to about 4,200 g/ft$^3$. In these embodiments, the IMP layer can be modified with nickel (Ni) and light lanthanides. In an example, light lanthanides include yttrium (Y), lanthanum (La), praseodymium (Pr), and neodymium (Nd).

In other embodiments, the IMP layer is implemented as a doped iron-rhodium oxide composition having a formula $A_aRh_bFe_cO_X$. In these embodiments, A is implemented as zinc (Zn), Ni, cobalt (Co), manganese (Mn), magnesium (Mg), calcium (Ca), strontium (Sr), Y, La, Ce, Pr, Nd, terbium (Tb), ytterbium (Yb), gallium (Ga), barium (Ba), lanthanides, and combinations thereof. Further to these embodiments, the doped iron-rhodium oxide composition loadings range from about 400 g/ft$^3$ to about 9,600 g/ft$^3$ (rich in Fe side). Still further to these embodiments, a ranges from about 0 to about 0.3 mole fraction. In these embodiments, b is greater than or equal to about 0.0004 mole fraction. Further to these embodiments, c ranges from about 0.69 to about 0.9996 mole fraction.

In some embodiments, a variety of TWC systems are configured to assess their catalytic performance by measuring tailpipe (TP) emissions according to the worldwide harmonized light duty test cycle (WLTC) protocol. In these embodiments, the TWC systems are configured to include a PGM-based Original Equipment Manufacturer (OEM) close-coupled (CC) catalyst and a cGPF or a PGM-based OEM underfloor (UF) catalyst. Further to these embodiments, the configured TWC systems are mechanically coupled to and in fluidic communication with an internal combustion engine, such as a gasoline fueled internal combustion engine, amongst others, for emission certification testing according to the WLTC protocol. In these embodiments, catalytic efficiency of the aforementioned CC catalyst and cGPF measured at TP (bag results) for the TWC systems is assessed according to the WLTC protocol and further compared with the emissions measured for the PGM-based OEM CC and UF catalysts.

In some embodiments, catalysts Type A-E are aged employing a four (4) mode aging protocol at about 1000° C. for about 20 hours and further tested employing a series of test procedures. In these embodiments, test procedures include: TWC isothermal steady-state oxygen storage capacity (OSC) and TWC standard light-off (LO) tests. Test results confirm that catalysts Type A-E are capable of providing a significant performance improvement in $NO_X$ reduction, and CO and THC oxidation, as well as being capable of playing a major role in overall conversion performance compared to the PGM-based OEM catalysts in TWC applications.

In some embodiments, cGPF Type A and catalysts Type A-E can be produced using any conventional synthesis methodology (e.g., co-milling, co-precipitation, nitrate combustion, sol-gel, and incipient wetness, amongst others).

In one aspect, embodiments of the invention are directed to a coated gasoline particulate filter comprising a substrate and a catalytic layer deposited onto the substrate, wherein the catalytic layer comprises (i) a composition comprising a platinum group metal, iron, and cerium; or (ii) a doped iron-rhodium oxide composition having the formula $A_aRh_bFe_cOx$, where a is a value from about 0 to 0.3 mole fraction, b is greater than or equal to about 0.0004 mole fraction, and c is from about 0.69 to about 0.9996 mole fraction.

In one embodiment, the catalytic layer comprises a composition comprising a platinum group metal, iron, and cerium, and wherein the platinum group metal is rhodium. In one embodiment, the catalytic composition has a loading of the rhodium is from about 1 to 100 g/ft$^3$, a loading of the iron is from about 200 to 1,680 g/ft$^3$, and a loading of the cerium is about 200 to 4,200 g/ft$^3$. In some embodiments, the catalytic layer further comprises one or more of nickel and a lanthanide selected from the group consisting of yttrium, lanthanum, praseodymium, and neodymium.

In some embodiments of the particulate filter, the substrate comprises a cordierite wall-flow filter. In other embodiments of the particulate filter, the substrate comprises a cordierite flow-through monolith.

In one embodiment, the catalytic layer of the particulate filter comprises a doped iron-rhodium composition having the formula $A_aRh_bFe_cOx$, and wherein a is a value from about 0.01 to 0.3 mole fraction, such as a value for a that is from about 0.05 to 0.2 mole fraction. In some embodiments, the catalytic layer of the particulate filter comprises a doped iron-rhodium composition having the formula $A_aRh_bFe_cOx$, and wherein b is a value from about 0.002 to 0.01 mole fraction.

In certain embodiments, the particulate filter may exhibit an increase in back-pressure less than about 5% in comparison to an identical blank filter substrate.

In some embodiments, the catalytic layer may be deposited onto the substrate by a method selected from the group consisting of co-milling, co-precipitation, nitrate combustion, impregnation, sol-gel, and incipient wetness. In a preferred embodiment, the catalytic layer is deposited onto the substrate by an impregnation method.

In a further aspect, embodiments of the invention are directed to a catalytic system for treating an exhaust stream of a combustion engine in which the system comprises a combustion engine; a close-coupled catalytic converter configured and arranged to accept at least on exhaust stream from said combustion engine, the close-coupled catalytic converter comprising a platinum group metal catalyst; and a coated gasoline particulate filter downstream of, and in fluid communication with said close-coupled catalytic converter. Preferably, the particulate filter comprises a substrate onto which a catalytic layer is deposited. In some embodiments, the catalytic layer comprises (i) a composition comprising a platinum group metal, iron, and cerium; or (ii) a doped iron-rhodium composition having the formula $A_aRh_bFe_cOx$, where a is a value from about 0 to 0.3 mole fraction, b is greater than or equal to about 0.0004 mole fraction, and c is from about 0.69 to about 0.9996 mole fraction, and A is selected from the group consisting of zinc, nickel, cobalt, manganese, magnesium, calcium, strontium, yttrium, cerium, lanthanum, praseodymium, neodymium, terbium, ytterbium, gallium, and barium.

In some embodiments, the catalytic system may exhibit a comparable reduction in tailpipe emissions of $NO_X$, CO, THC, and NMHC in comparison to a similar system having an underfloor catalytic converter comprising a platinum group metal catalyst as a downstream converter.

In one embodiment of the catalytic system, the catalytic layer of the particulate filter comprises a composition comprising rhodium, iron, and cerium. For example, the catalytic layer may have a loading of the rhodium is from about 1 to 100 g/ft$^3$, a loading of the iron is from about 200 to 1,680 g/ft$^3$, and a loading of the cerium is about 200 to 4,200 g/ft$^3$. In some embodiments, the catalytic layer may further comprise one or more of nickel and a lanthanide selected from the group consisting of yttrium, lanthanum, praseodymium, and neodymium.

In some embodiments of the catalytic system, the catalytic layer comprises a doped iron-rhodium composition having the formula $A_aRh_bFe_cOx$, and wherein a is a value from about 0.01 to 0.3 mole fraction, and wherein b is a value from about 0.002 to 0.01 mole fraction. In one embodiment, a is a value from about 0.05 to 0.2 mole fraction.

In yet another aspect, embodiments of the invention are directed to a catalyst comprising a cordierite flow-through monolith substrate and a catalytic layer deposited onto the substrate, wherein the catalytic layer comprises a doped iron-rhodium catalyst composition having the formula $A_aRh_bFe_cOx$, wherein a is a value from about 0 to 0.3 mole fraction, b is greater than or equal to about 0.0004 mole fraction, and c is from about 0.69 to about 0.9996 mole fraction, and A is selected from the group consisting of zinc, nickel, cobalt, manganese, magnesium, calcium, strontium, yttrium, cerium, lanthanum, praseodymium, neodymium, terbium, ytterbium, gallium, and barium, and wherein the loading of the catalyst composition on the substrate is from about 400 to 9,600 g/ft$^3$.

In some embodiments, the catalyst exhibits $T_{50}$ conversion temperatures for NOx and CO less than 245° C., and a $T_{50}$ conversion temperatures for THC less than 262° C. In one embodiment, the catalyst exhibits an $O_2$ delay time that is between about 26 and 31 seconds.

In certain embodiments, a is a value from about 0.01 to 0.3 mole fraction, and in particular, from about 0.05 to 0.2 mole fraction, and b is a value from about 0.002 to 0.01 mole fraction. In a preferred embodiment, A is nickel, lanthanum, or a combination thereof.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
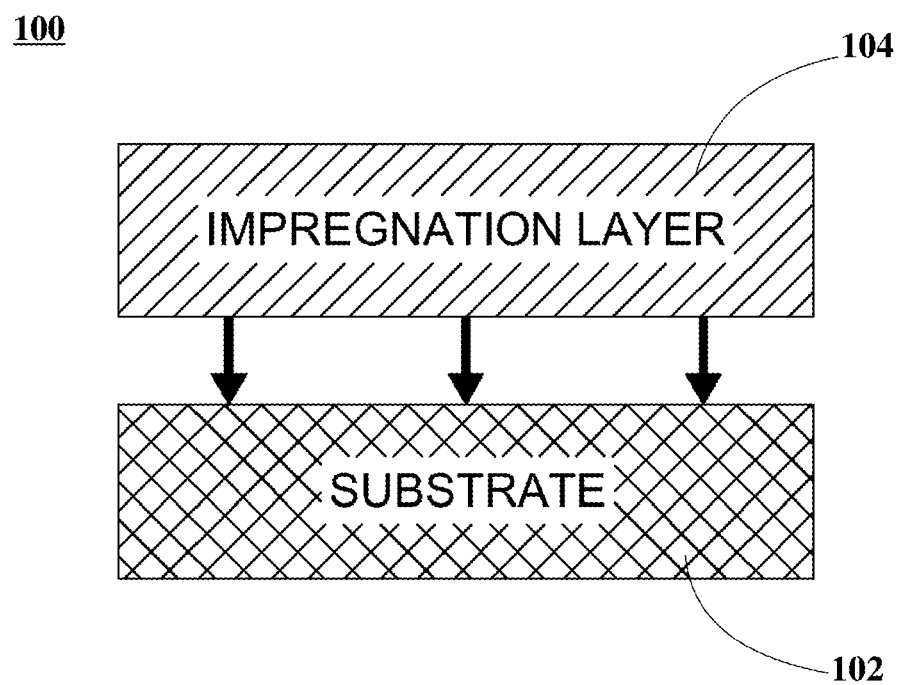
FIG. 1 is a graphical representation illustrating a filter configuration of a coated gasoline particulate filter (cGPF), according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Blank" refers to a catalyst system or catalytic converter that is uncatalyzed (e.g., no catalytic material compositions, just a bare substrate).

"Calcination and Calcined" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalyst system" refers to any system including a catalyst of at least two layers comprising a substrate, a washcoat layer and/or an impregnation layer.

"Close-Coupled (CC) catalyst" refers to a catalyst located near the engine's exhaust manifold.

"Conversion" refers to the chemical alteration of at least one material into one or more other materials.

"Impregnation (IMP)" refers to the process of imbuing or saturating a solid layer with a liquid compound or the diffusion of some element through a medium or substance.

"Light-off (LO)" refers to the time elapsed from an engine cold start to the point of 50 percent pollutant conversion.

"Non-Methane Hydrocarbons (NMHC)" refer to the sum of all hydrocarbon air pollutants except methane.

"Original Equipment Manufacturer (OEM)" refers to a manufacturer of a new vehicle or a manufacturer of any part or component that is originally installed in a new vehicle's certified emission control system.

"Oxygen storage capacity (OSC)" refers to the ability of materials used as oxygen storage material (OSM) in catalysts to store oxygen at lean conditions and to release it at rich conditions.

"Platinum group metals (PGM)" refers to platinum, palladium, ruthenium, iridium, osmium, and rhodium.

"Substrate" refers to any material of any shape or configuration that yields a sufficient surface area for depositing a washcoat layer, an overcoat layer and/or an impregnation layer.

"$T_{50}$" refers to the temperature at which 50% of a material is converted.

"$T_{90}$" refers to the temperature at which 90% of a material is converted.

"Three-way catalyst (TWC)" refers to a catalyst that performs the three simultaneous tasks of reduction of nitrogen oxides to nitrogen and oxygen, oxidation of carbon monoxide to carbon dioxide, and oxidation of unburnt hydrocarbons to carbon dioxide and water.

"Underfloor (UF) catalyst" refers to a catalyst that is incorporated into the exhaust system of a motor vehicle, typically located beneath the floor of a vehicle, mechanically coupled downstream to a close-coupled (CC) catalyst.

Description of the Disclosure

The present disclosure describes coated gasoline particulate filters (cGPFs) that are produced according to varied catalyst configurations, which include Fe—Ce (rich)-activated Rh compositions. These cGPFs are incorporated within engine systems as components of TWC systems for controlling and reducing engine exhaust emissions. The conversion performance of these TWC systems is assessed and compared using the driving phases described in the worldwide harmonized light duty test cycle (WLTC) protocol. These TWC systems exhibit a significant catalytic performance that is comparable with the catalytic performance of PGM-based Original Equipment Manufacturer (OEM) catalysts employed in TWC applications.

Coated Gasoline Particulate Filter (cGPF) Configuration and Production

FIG. 1 is a graphical representation illustrating a filter configuration of a coated gasoline particulate filter (cGPF), according to an embodiment. In FIG. 1, filter configuration 100 includes substrate 102 and impregnation (IMP) layer 104. In some embodiments, IMP layer 104 is impregnated onto substrate 102.

In some embodiments, substrate 102 materials include a refractive material, a ceramic material, a metallic material, or suitable combinations, amongst others. In an example, substrate 102 is implemented as a ceramic wall-flow filter substrate. In another example, substrate 102 is implemented as a ceramic flow-through monolith substrate.

In some embodiments, IMP layer 104 is implemented as a PGM composition in combination with iron (Fe) and cerium (Ce) loadings (rich in Ce side). In these embodiments, the PGM composition includes platinum (Pt), palladium (Pd), ruthenium (Ru), iridium (Ir), and rhodium (Rh), either by themselves, or in combinations thereof employing different loadings. In an example, the PGM composition includes Rh loadings within a range from about 1 $g/ft^3$ to about 100 $g/ft^3$. Further to these embodiments, Fe loadings range from about 200 $g/ft^3$ to about 1,680 $g/ft^3$. Still further to these embodiments, Ce loadings range from about 200 $g/ft^3$ to about 4,200 $g/ft^3$. In these embodiments, IMP layer 104 can be modified with nickel (Ni) and light lanthanides. In an example, light lanthanides include yttrium (Y), lanthanum (La), praseodymium (Pr), and neodymium (Nd).

In other embodiments, IMP layer 104 is implemented as a doped iron-rhodium oxide composition having a formula $A_a Rh_b Fe_c O_x$. In these embodiments, A is implemented as zinc (Zn), Ni, cobalt (Co), manganese (Mn), magnesium (Mg), calcium (Ca), strontium (Sr), Y, La, Ce, Pr, Nd, terbium (Tb), ytterbium (Yb), gallium (Ga), barium (Ba), lanthanides, and combinations thereof. Further to these embodiments, the doped iron-rhodium oxide composition loadings range from about 400 $g/ft^3$ to about 9,600 $g/ft^3$ (rich in Fe side). Still further to these embodiments, a ranges from about 0 to about 0.3 mole fraction. In these embodiments, b is greater than or equal to about 0.0004 mole fraction. Further to these embodiments, c ranges from about 0.69 to about 0.9996 mole fraction. As is generally known to one of skill in the art, the value of x may readily be determined based on the constituents of the composition and the values of a, b, and c. For example, in some embodiments, x may range from 1 to 20, and in particular, from 1 to 10.

In one embodiment, a is a value ranging from about 0.01 to 0.3 mole fraction, and in particular, from about 0.05 to 0.3 mole fraction, and more particularly, from about 0.1 to 0.3 mole fraction. For example, a may be a value from about 0.05 to 0.29 mole fraction, from about 0.05 to 0.2 mole fraction, from about 0.05 to 0.14 mole fraction, from about 0.1 to 0.25 mole fraction, and from about 0.14 to 0.2 mole fraction.

In certain embodiment, a is a value greater than 0.01 mole fraction, greater than 0.02 mole fraction, greater than 0.03 mole fraction, greater than 0.04 mole fraction, greater than 0.05 mole fraction, greater than 0.06 mole fraction, greater than 0.07 mole fraction, greater than 0.08 mole fraction, greater than 0.09 mole fraction, greater than 0.1 mole fraction, greater than 0.11 mole fraction, greater than 0.12 mole fraction, greater than 0.13 mole fraction, greater than 0.14 mole fraction, greater than 0.15 mole fraction, greater than 0.16 mole fraction, greater than 0.17 mole fraction, greater than 0.18 mole fraction, greater than 0.19 mole fraction, greater than 0.2 mole fraction, greater than 0.21 mole fraction, greater than 0.22 mole fraction, greater than 0.23 mole fraction, greater than 0.24 mole fraction, greater than 0.25 mole fraction, greater than 0.26 mole fraction, greater than 0.27 mole fraction, greater than 0.28 mole fraction, and greater than 0.29 mole fraction. In some embodiments, a is a value less than about 0.3 mole fraction, less than 0.29 mole fraction, less than 0.28 mole fraction, less than 0.27 mole fraction, less than 0.26 mole fraction, less than 0.25 mole fraction, less than 0.24 mole fraction, less than 0.23 mole fraction, less than 0.22 mole fraction, less than 0.21 mole fraction, less than 0.2 mole fraction, less than 0.19 mole fraction, less than 0.18 mole fraction, less than 0.17 mole fraction, less than 0.16 mole fraction, less than 0.15 mole fraction, less than 0.14 mole fraction, less than 0.13 mole fraction, less than 0.12 mole fraction, less than 0.11 mole fraction, less than 0.1 mole fraction, less than 0.09 mole fraction, less than 0.08 mole fraction, less than 0.07 mole fraction, less than 0.06 mole fraction, less than 0.05 mole fraction, less than 0.05 mole fraction, less than 0.04 mole fraction, less than 0.03 mole fraction, less than 0.02 mole fraction, and less than 0.01 mole fraction.

In one embodiment, b is a value ranging from about 0.0004 to 0.1 mole fraction, and in particular, from about 0.001 to 0.01 mole fraction, and more particularly, from about 0.002 to 0.01 mole fraction. For example, b may be a value from about 0.002 to 0.009 mole fraction, from about 0.0025 to 0.008 mole fraction, from about 0.003 to 0.007 mole fraction, from about 0.0035 to 0.006 mole fraction, and from about 0.0038 to 0.004 mole fraction.

In a first example, a cGPF, herein referred to as cGPF Type A, is produced including a cordierite wall-flow filter substrate, such as, for example 1.0 L cordierite wall-flow filter substrate having a diameter of about 118.4 mm, a length of about 91 mm, a porosity of about 65%, a cell density of about 300 cells per square inch (cpsi), and a wall thickness of about 8 mm. In this example, the IMP layer includes a Rh loading of about 9 g/ft$^3$, a Fe loading of about 420 g/ft$^3$, and a Ce loading of about 1,050 g/ft$^3$, which is impregnated onto the cordierite wall-flow filter substrate.

In this example, the production of the IMP layer for cGPF Type A begins with the preparation of an impregnation solution comprising Rh, Fe, and Ce. Further to this example, the impregnation solution is produced by mixing Rh nitrate solution, Fe nitrate nonohydrate crystals, and Ce (III) nitrate solution. In this example, modifiers such as Ni nitrate and lanthanide nitrates (e.g., Y, La, Pr, Nd nitrates) may be added to the impregnation solution. Further to this example, the impregnation solution is heated to a temperature below 100° C. to rapidly dissolve the Fe salt into the Ce solution as well as to reduce solution's viscosity.

In this example, the warmed impregnation solution is then impregnated onto the cordierite wall-flow filter substrate. Further to this example, the filter is impregnated with a ½ impregnation solution dose onto the front face of the cordierite wall-flow filter substrate and with a ½ impregnation solution dose onto the rear face of the cordierite wall-flow filter substrate. In this example, the total dose mass of the impregnation solution is about 271 grams. Further to this example, the impregnated cordierite wall-flow filter substrate is allowed to settle for about 15 min to about 100 min. In this example, the impregnated cordierite wall-flow filter substrate is calcined from about 500° C. to about 800° C. for about 2 hours to about 10 hours, being preferred at about 550° C. for about 4 hours, to generate the oxides within the porous walls of the cordierite wall-flow filter substrate.

cGPF Back-Pressure Measurements

In some embodiments, back-pressure measurements are performed prior to the impregnation step and after the impregnation-firing step. In these embodiments, back-pressure is measured multiple times in both the forward and reverse gas flow directions. Further to these embodiments, volumetric flow of the gas ranges from about 250 ft$^3$/min to about 300 ft$^3$/min at ambient temperature. Still further to these embodiments, the cGPFs exhibit a minimum increase in back-pressure, which is less than about 5% when compared to blank filter substrates.

Catalyst Configuration and Production

In a second example, a catalyst, herein referred to as catalyst Type A, is produced including a cordierite flow-through monolith substrate, such as, for example 1.0 L cordierite flow-through monolith substrate having a diameter of about 118.4 mm, a length of about 91 mm, a cell density of about 600 cpsi, and a wall thickness of about 3 mm. In this example, the IMP layer includes a Rh loading of about 9 g/ft$^3$, a Fe loading of about 420 g/ft$^3$, and a Ce loading of about 1,050 g/ft$^3$, which is impregnated onto the cordierite flow-through monolith substrate.

In this example, the production of the IMP layer for catalyst Type A begins with the preparation of an impregnation solution comprising Rh, Fe, and Ce. Further to this example, the impregnation solution is produced by mixing Rh nitrate solution, Fe nitrate nonohydrate crystals, and Ce (III) nitrate solution. In this example, modifiers such as Ni nitrate and lanthanide nitrates (e.g., Y, La, Pr, Nd nitrates) may be added to the impregnation solution. Further to this example, the impregnation solution is heated to a temperature below 100° C. to rapidly dissolve the Fe salt into the Ce solution as well as to reduce solution's viscosity.

In this example, the warmed impregnation solution is then impregnated onto the cordierite flow-through monolith substrate. Further to this example, the monolith substrate is impregnated with a ½ impregnation solution dose onto the front face of the cordierite flow-through monolith substrate and with a ½ impregnation solution dose onto the rear face of the cordierite flow-through monolith substrate. In this example, the impregnated cordierite flow-through monolith substrate is allowed to settle for about 15 min to about 100 min. Further to this example, the impregnated cordierite flow-through monolith substrate is calcined from about 500° C. to about 800° C. for about 2 hours to about 10 hours, being preferred at about 550° C. for about 4 hours, to generate the oxides within the porous walls of the cordierite flow-through monolith substrate.

In a third example, a catalyst, herein referred to as catalyst Type B, is produced including a cordierite flow-through monolith substrate, such as, for example 1.0 L cordierite flow-through monolith substrate having a diameter of about 118.4 mm, a length of about 91 mm, a cell density of about 600 cpsi, and a wall thickness of about 3 mm. In this example, the IMP layer includes a doped iron-rhodium oxide composition having a formula $A_aRh_bFe_cO_X$ with a loading of about 1,800 $g/ft^3$ (including about 9 $g/ft^3$ Rh), which is impregnated onto the cordierite flow-through monolith substrate. Further to this example, A is implemented as Ni+La. Still further to this example, a comprises 0.05 Ni mole fraction+0.15 La mole fraction. In this example, b is about 0.00388 mole fraction. Further to this example, c is about 0.80 mole fraction.

In this example, the production of the IMP layer for catalyst Type B begins with the preparation of an impregnation solution comprising Rh, Fe, Ni, and La. Further to this example, the impregnation solution is produced by mixing Fe nitrate nonohydrate crystals, Rh nitrate solution, Ni nitrate salt, La nitrate salt, and water. Still further to this example, the impregnation solution is heated to a temperature below 100° C. to rapidly dissolve the Fe salt into the impregnation solution as well as to reduce solution's viscosity.

In this example, the warmed impregnation solution is then impregnated onto the cordierite flow-through monolith substrate. Further to this example, the monolith substrate is impregnated with a ½ impregnation solution dose onto the front face of the cordierite flow-through monolith substrate and a ½ impregnation solution dose onto the rear face of the cordierite flow-through monolith substrate. In this example, the impregnated cordierite flow-through monolith substrate is allowed to settle for about 15 min to about 100 min. Further to this example, the impregnated cordierite flow-through monolith substrate is calcined from about 500° C. to about 800° C. for about 2 hours to about 10 hours, being preferred at about 550° C. for about 4 hours, to generate the oxides within the porous walls of the cordierite flow-through monolith substrate.

In this example, the impregnation and calcination step is repeated until the coating mass level reaches a loading of about 1,800 $g/ft^3$. Further to this example, the impregnation and calcination step takes three (3) impregnation/calcination cycles to reach the aforementioned coating mass level.

In a fourth example, a catalyst, herein referred to as catalyst Type C, is produced in a substantially similar manner as previously described above for catalyst Type B. In this example, the IMP layer includes a doped iron-rhodium oxide composition having a formula $A_aRh_bFe_cO_X$ with a loading of about 1,800 $g/ft^3$ (including about 9 $g/ft^3$ Rh), which is impregnated onto the cordierite flow-through monolith substrate. Further to this example, A is implemented as Ni. Still further to this example, a is about 0.05 mole fraction. In this example, b is about 0.00388 mole fraction. Further to this example, c is about 0.95 mole fraction.

In a fifth example, a catalyst, herein referred to as catalyst Type D, is produced in a substantially similar manner as previously described above for catalyst Type B. In this example, the IMP layer includes a doped iron-rhodium oxide composition having a formula $A_aRh_bFe_cO_X$ with a loading of about 1,800 $g/ft^3$ (including about 9 $g/ft^3$ Rh), which is impregnated onto the cordierite flow-through monolith substrate. Further to this example, A is implemented as Nd. Still further to this example, a is about 0.143 mole fraction. In this example, b is about 0.00388 mole fraction. Further to this example, c is about 0.853 mole fraction.

In a sixth example, a catalyst, herein referred to as catalyst Type E, is produced in a substantially similar manner as previously described above for catalyst Type B. In this example, the IMP layer includes a doped iron-rhodium oxide composition having a formula $A_aRh_bFe_cO_X$ with a loading of about 1,800 $g/ft^3$ (including about 9 $g/ft^3$ Rh), which is impregnated onto the cordierite flow-through monolith substrate. Further to this example, a is zero. In this example, b is about 0.00388 mole fraction. Further to this example, c is about 0.996 mole fraction.

In some embodiments, cGPF Type A and catalysts Type A-E can be produced using any conventional synthesis methodology (e.g., co-milling, co-precipitation, nitrate combustion, sol-gel, and incipient wetness, amongst others).

TWC System Configuration

Figure 2:
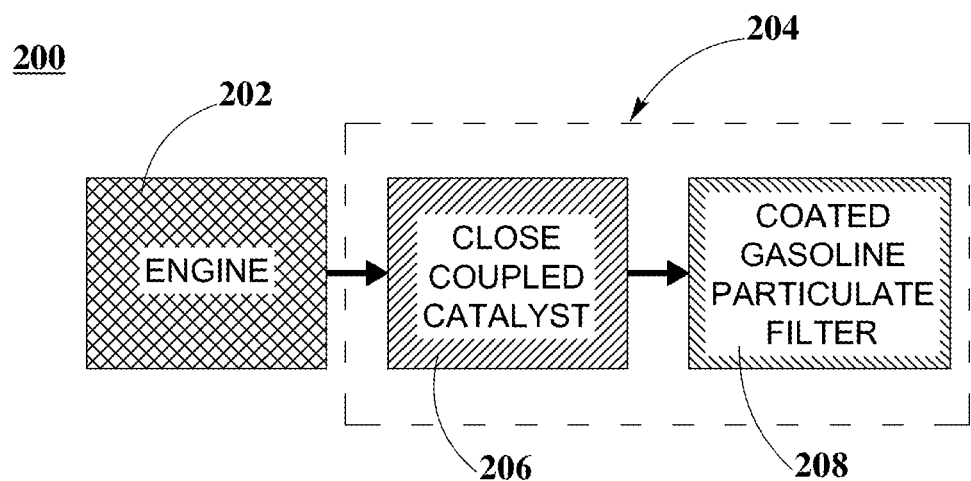
FIG. 2 is a graphical representation illustrating a configuration for three-way catalyst (TWC) exhaust systems including a close-coupled (CC) catalyst and a cGPF, according to an embodiment.

FIG. 2 is a graphical representation illustrating a configuration for three-way catalyst (TWC) exhaust systems including a close-coupled (CC) catalyst and a cGPF, according to an embodiment. In FIG. 2, engine system 200 includes engine 202 and TWC system 204. TWC system 204 further includes CC catalyst 206 and cGPF 208. In FIG. 2, engine 202 is mechanically coupled to and in fluidic communication with TWC system 204. In TWC system 204, CC catalyst 206 is mechanically coupled to and in fluidic communication with cGPF 208.

In some embodiments, engine 202 can be implemented as an internal combustion engine employed within a motor vehicle, such as, for example a gasoline fueled internal combustion engine, amongst others. In these embodiments, CC catalyst 206 and cGPF 208 are implemented as PGM-based catalyst systems. Further to these embodiments, a variety of TWC systems can be configured to assess and compare the catalytic performance when employed with engine 202. In an example, engine 202 is a Geely 1.5 L 4G15N-C6.

TWC System 1

In some embodiments, TWC system 204, herein referred to as TWC system 1, is implemented to include a PGM-based original equipment manufacturer (OEM) CC catalyst and a cGPF. In these embodiments, CC catalyst 206 is a PGM-based OEM CC catalyst with a PGM loading of about 50 $g/ft^3$ Pd and about 5 $g/ft^3$ Rh, resulting in a total PGM loading of about 55 $g/ft^3$ and a substrate having a volume of about 0.5 L. Further to these embodiments, cGPF 208 is a cGPF Type A that includes a PGM loading of about 9 $g/ft^3$ Rh in combination with Fe and Ce loadings (see first example above).

TWC System 2

In some embodiments, TWC system 204, herein referred to as TWC system 2, is implemented to include a PGM-based OEM CC catalyst as described previously above in TWC system 1 and an OEM underfloor (UF) catalyst. In these embodiments, the cGPF is replaced with an OEM UF catalyst. Further to these embodiments, cGPF 208 is implemented as an OEM UF catalyst with a PGM loading of about 10 $g/ft^3$ Pd and about 5 $g/ft^3$ Rh, resulting in a total PGM loading of about 15 $g/ft^3$ and a substrate having a volume of about 1.3 L.

TWC System 3

In some embodiments, TWC system 204, herein referred to as TWC system 3, is implemented to include a PGM-based CC catalyst as described previously above in TWC system 1 and a blank substrate. In these embodiments, the cGPF is replaced with a blank substrate to determine the effect of having a cGPF within a TWC system.

In some embodiments, TWC systems 1, 2, and 3 are mechanically coupled to and in fluidic communication with a gasoline fueled internal combustion engine used for testing the aforementioned TWC systems.

In other embodiments, TWC system 204 is implemented to include only cGPF 208 and installed very close to the exhaust port of the engine (e.g., close-coupled position). In these embodiments, cGPF 208 is a cGPF Type A that includes a PGM loading of about 9 g/ft³ Rh in combination with Fe and Ce loadings (see first example above).

In further embodiments, TWC system 204 is implemented to include CC catalyst 206 and cGPF 208 within a single unit can and installed very close to the exhaust port of the engine (e.g., close-coupled position). In these embodiments, CC catalyst 206 is implemented as a PGM-based OEM CC catalyst. Further to these embodiments, cGPF 208 is a cGPF Type A that includes a PGM loading of about 9 g/ft³ Rh in combination with Fe and Ce loadings (see first example above).

Worldwide Harmonized Light Duty Test Cycle (WLTC)

Figure 3:
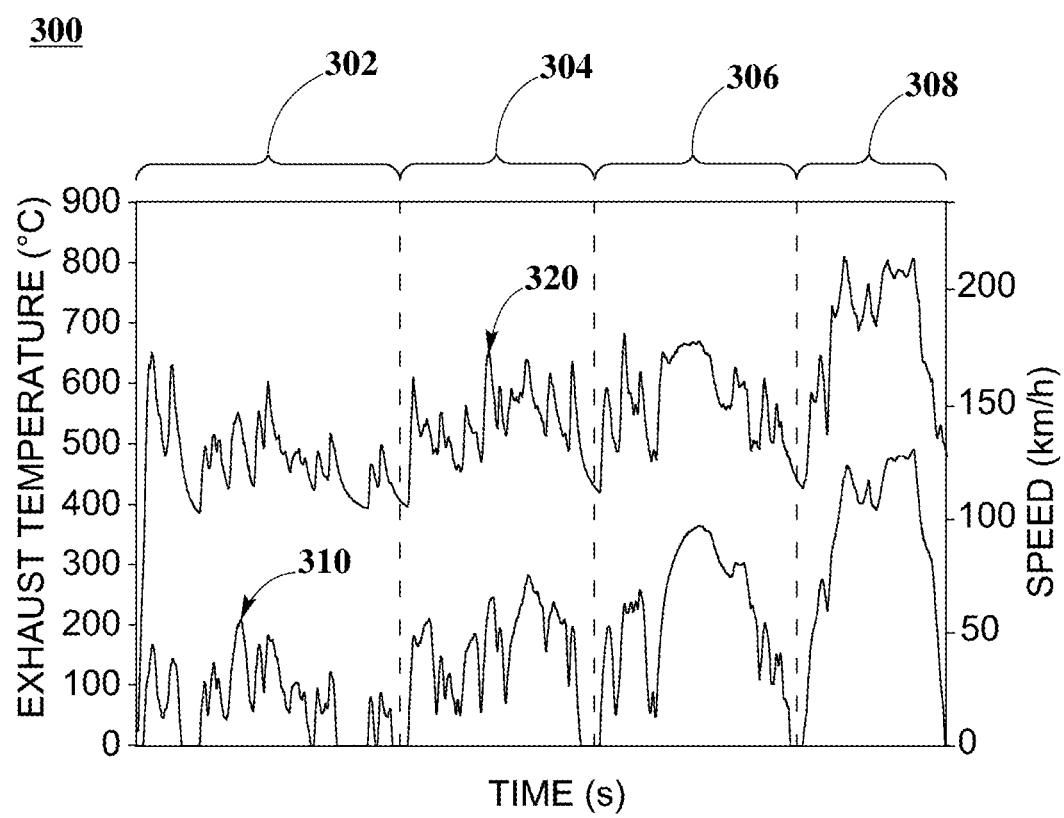
FIG. 3 is a graphical representation illustrating driving phases of the worldwide harmonized light duty test cycle (WLTC) protocol employed for testing, measuring, and diagnosing catalytic performance of TWC systems as described in FIG. 2, according to an embodiment.

FIG. 3 is a graphical representation illustrating driving phases of the worldwide harmonized light duty test cycle (WLTC) employed for testing, measuring, and diagnosing catalytic performance of TWC systems as described in FIG. 2, according to an embodiment. In FIG. 3, WLTC protocol 300 includes WLTC speed profile 310 and WLTC temperature profile 320. In FIG. 3, WLTC speed profile 310 includes low phase 302, medium phase 304, high phase 306, and extra high phase 308.

In some embodiments, low phase 302 illustrates a phase of WLTC testing to measure tailpipe emissions and performance of the aforementioned TWC systems. In these embodiments, said driving phase is a low speed phase having a speed up to about 60 km/h for a time duration of about 589 seconds, which includes 5 micro-trips and 6 stops. Further to these embodiments, medium phase 304 illustrates a phase for driving conditions at a speed from about 60 km/h to about 80 km/h for a time duration of about 433 seconds, which includes 1 micro-trip and 2 stops. Still further to these embodiment, high phase 306 illustrates a phase for driving condition at a speed from about 80 km/h to about 110 km/h for a time duration of about 455 seconds, which includes 1 micro-trip and 2 stops. In these embodiments, extra high phase 308 illustrate a phase for driving condition at a speed greater than about 110 km/h for a time duration of about 323 seconds, which includes 1 micro-trip and 2 stops. Further to these embodiments, tailpipe emissions from each phase are collected in a separate bag, analyzed, and expressed in mg/km.

Emission Bag Results from WLTC

Figure 4:
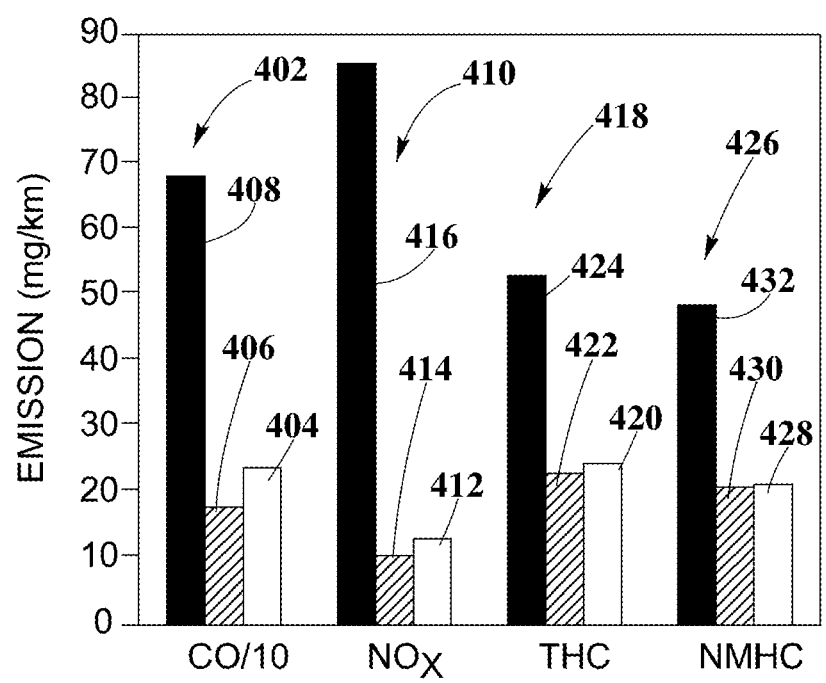
FIG. 4 is a graphical representation illustrating CO, $NO_X$, THC and NMHC (mg/km) emission values for TWC systems 1, 2, and 3 employed within a gasoline fueled internal combustion engine using WLTC protocol as described in FIG. 3, according to an embodiment.

FIG. 4 is a graphical representation illustrating CO, $NO_X$, THC and NMHC (mg/km) emission values for TWC systems 1, 2, and 3 employed within a gasoline fueled internal combustion engine using WLTC protocol as described in FIG. 3, according to an embodiment. In FIG. 4, emission 400 includes CO emission 402, $NO_X$ emission 410, THC emission 418, and NMHC emission 426.

In some embodiments, CO emission 402 includes three specific CO bars as follows: CO bar 404, CO bar 406, and CO bar 408. In these embodiments, each CO bar illustrates the WLTC bag results (mg/km) associated with TWC systems 1, 2, and 3. Further to these embodiments, the value for CO emission has been divided by 10 (denoted as CO/10) to be at the same level of other pollutant emissions. In other embodiments, $NO_X$ emission 410 includes three specific $NO_X$ bars as follows: $NO_X$ bar 412, $NO_X$ bar 414, and $NO_X$ bar 416. In these embodiments, each $NO_X$ bar illustrates the WLTC bag results (mg/km) associated with TWC systems 1, 2, and 3. In further embodiments, THC emission 418 includes three specific THC bars as follows: THC bar 420, THC bar 422, and THC bar 424. In these embodiments, each THC bar illustrates the WLTC bag results (mg/km) associated with TWC systems 1, 2, and 3. In yet further embodiments, NMHC emission 426 includes three specific NMHC bars as follows: NMHC bar 428, NMHC bar 430, and NMHC bar 432. In these embodiments, each NMHC bar illustrates the WLTC bag results (mg/km) associated with TWC systems 1, 2, and 3.

In some embodiments, CO, $NO_X$, THC and NMHC emissions are bag results collected during implementation of WLTC testing associated with TWC systems 1, 2, and 3 as detailed in Table 1, below. In these embodiments, TWC system 1 exhibits a significant catalytic performance that is comparable with the catalytic performance of the TWC system 2 (PGM-based OEM CC and UF catalysts), thereby confirming that employing the cGPF Type A (9 g/ft³ PGM loading) is as efficient as employing PGM-based OEM UF catalyst (15 g/ft³ PGM loading) for CO, $NO_X$, THC and NMHC conversions. Further to these embodiments, comparison between TWC systems 1 and 3 show the benefit of having a cGPF at UF catalyst positions for cleaning-up pollutant emissions from the exhaust engine that have not been removed by a CC catalyst.

TABLE 1

CO, NOx, THC and NMHC emission WLTC bag results associated with TWC systems 1, 2, and 3, as illustrated in FIG. 4.

| POLLUTANT | TWC SYSTEM | EMISSION [mg/km] | ASSOCIATED ELEMENT |
| --- | --- | --- | --- |
| CO/10 | 1 | 23.90 | 404 |
| NOx | 1 | 13.07 | 412 |
| THC | 1 | 24.56 | 420 |
| NMHC | 1 | 21.36 | 428 |
| CO/10 | 2 | 17.91 | 406 |
| NOx | 2 | 10.51 | 414 |
| THC | 2 | 23.03 | 422 |
| NMHC | 2 | 20.90 | 430 |
| CO/10 | 3 | 68.37 | 408 |
| NOx | 3 | 85.58 | 416 |
| THC | 3 | 53.23 | 424 |
| NMHC | 3 | 48.75 | 432 |

Figure 5:
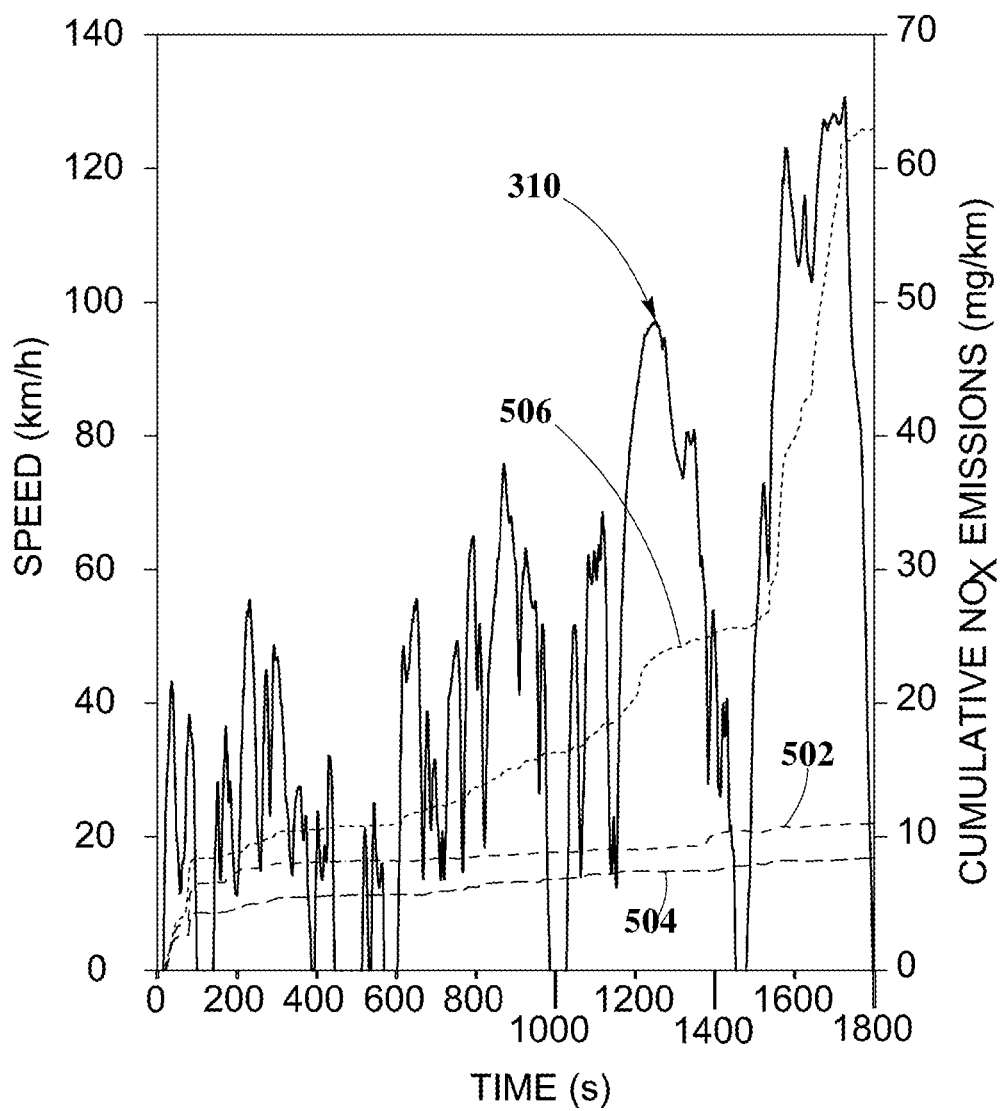
FIG. 5 is a graphical representation illustrating cumulative tailpipe (TP) $NO_X$ emission results for TWC systems 1, 2 and 3 employed within a gasoline fueled internal combustion engine at given speeds using WLTC protocol as described in FIG. 3, according to an embodiment.

FIG. 5 is a graphical representation illustrating cumulative tailpipe (TP) $NO_X$ emission results for TWC systems 1, 2 and 3 employed within a gasoline fueled internal combustion engine at given speeds using WLTC protocol as described in FIG. 3, according to an embodiment. In FIG. 5, cumulative $NO_X$ values comparison 500 includes cumulative $NO_X$ curve 502, cumulative $NO_X$ curve 504, cumulative $NO_X$ curve 506, and WLTC speed profile 310. In FIG. 5, elements having substantially similar element numbers from previous figures function in a substantially similar manner.

In some embodiments, cumulative $NO_X$ curve 502 illustrates cumulative $NO_X$ emission results obtained at TP associated with TWC system 1 at given speeds. In these embodiments, cumulative $NO_X$ curve 504 illustrates cumulative $NO_X$ emission results obtained at TP associated with TWC system 2 at given speeds. Further to these embodiments, cumulative $NO_X$ curve 506 illustrates cumulative $NO_X$ emission results obtained at TP associated with TWC system 3 at given speeds.

In some embodiments, TWC system 1 exhibits cumulative TP $NO_X$ values (cumulative $NO_X$ curve 502) that is comparable with cumulative TP $NO_X$ values (cumulative $NO_X$ curve 504) of the TWC system 2 (PGM-based OEM CC and UF catalysts), thereby confirming that employing the cGPF Type A (9 g/ft³ PGM loading) is as efficient as employing PGM-based OEM OF catalyst (15 g/ft³ PGM loading) for $NO_X$ conversion. In these embodiments, cumulative TP $NO_X$ values (cumulative $NO_X$ curve 506) associated with TWC system 3 are significantly higher than cumulative TP $NO_X$ values (cumulative $NO_X$ curve 502) associated with TWC system 1, thereby confirming the advantage of having a cGPF for cleaning-up unconverted $NO_X$ from a CC catalyst.

Figure 6:
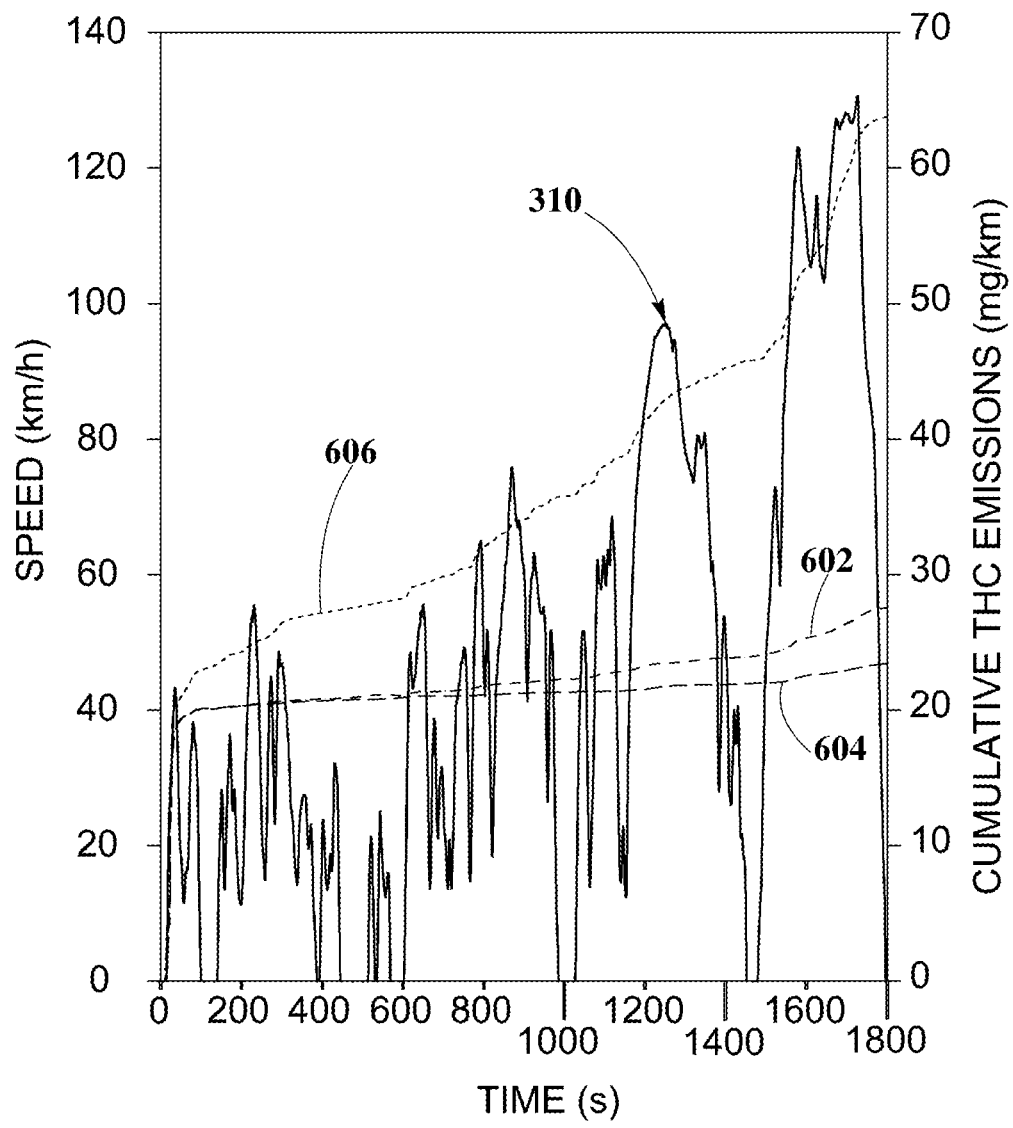
FIG. 6 is a graphical representation illustrating cumulative TP THC emission results for TWC systems 1, 2 and 3 employed within a gasoline fueled internal combustion engine at given speeds using WLTC protocol as described in FIG. 3, according to an embodiment.

FIG. 6 is a graphical representation illustrating cumulative TP THC emission results for TWC systems 1, 2 and 3 employed within a gasoline fueled internal combustion engine at given speeds using WLTC protocol as described in FIG. 3, according to an embodiment. In FIG. 6, cumulative THC values comparison 600 includes cumulative THC curve 602, cumulative THC curve 604, cumulative THC curve 606, and WLTC speed profile 310. In FIG. 6, elements having substantially similar element numbers from previous figures function in a substantially similar manner.

In some embodiments, TWC system 1 exhibits cumulative TP THC values (cumulative THC curve 602) that is comparable with cumulative TP THC values (cumulative THC curve 604) of the TWC system 2 (PGM-based OEM CC and OF catalysts), thereby confirming that employing the cGPF Type A (9 g/ft$^3$ PGM loading) is as efficient as employing PGM-based OEM OF catalyst (15 g/ft$^3$ PGM loading) for THC conversion. In these embodiments, cumulative TP THC values (cumulative THC curve 606) associated with TWC system 3 are significantly higher than cumulative TP THC values (cumulative THC curve 602) associated with TWC system 1, thereby confirming the advantage of having a cGPF for cleaning-up unconverted THC from a CC catalyst.

In summary, the catalytic behavior exhibited by TWC system 1 during WLTC protocol confirms significant $NO_X$, CO, THC, and NMHC conversion performance as effectively as employing a PGM-based TWC system 2. The significant conversion performance in case of TWC system 1 is enabled by cGPF Type A, which includes an IMP layer comprising Fe—Ce (rich)-activated Rh composition with a loading of about 9 g/ft$^3$ Rh.

Test Methodologies for Catalytic Performance Assessment of the TWC Catalysts

In some embodiments, different test methodologies are employed to assess catalytic performance of the catalysts Type A-E. In these embodiments, the test methodologies employed are TWC light-off (LO) tests and TWC standard isothermal oxygen storage capacity (OSC) tests. Further to these embodiments and prior to testing, the aforementioned catalysts Type A-E are aged employing a four (4) mode aging protocol. Still further to these embodiments, the catalysts Type A-E are aged employing the four (4) mode aging protocol at a bed temperature of about 1000° C. for about 20 hours. In these embodiments, core samples measuring about 1 inch in diameter and about 2 inches in length are taken from the coated monoliths employing a diamond core drill.

Light-Off (LO) Test Methodology

In some embodiments, the catalytic performance of the aged catalyst Type A-E is evaluated by performing a series of LO tests to determine the temperature at which 50% conversion ($T_{50}$) and the temperature at which 90% conversion ($T_{90}$) of pollutants including $NO_X$, CO, and THC are achieved. In these embodiments, the LO tests are performed using a gas stream composition including about 8,000 ppm CO, about 2,000 ppm hydrogen ($H_2$), about 400 ppm (C3) propene, about 100 ppm (C3) propane, about 1,000 ppm nitric oxide (NO), about 100,000 ppm water, about 100,000 ppm $CO_2$, $O_2$ concentration varying as a square wave signal within a range from about 4,234 ppm to about 8,671 ppm, and $N_2$ for the remaining amount. Further to these embodiments, the average R-value for the gas is about 1.05 and the square wave change in $O_2$ concentration results in an AFR span of about 0.4 units. Still further to these embodiments, the frequency of the $O_2$ variation is 0.5 Hz. In these embodiments, the LO tests are performed at a space velocity (SV) of about 90,000 hr$^{-1}$. Further to these embodiments, the temperature is stabilized at about 100° C. for about 2 minutes, and subsequently, the gas temperature ramps at about 40° C./min to about 550° C., while a gas blanket warms the core holder ramping at the same set point temperature. During these series of tests, the conversions of the gas species ($NO_X$, $CO_2$, and HC) are calculated at the temperature points of 50% conversion ($T_{50}$) and 90% conversion ($T_{90}$) for each pollutant.

TWC OSC Isothermal Oscillating Test

In some embodiments, OSC isothermal oscillating tests facilitate the determination of the $O_2$ and CO delay times for a selected number of cycles during which feed signals of $O_2$ and CO pulses are used to determine the OSC performance and verify the OSC aging stability of the aged catalysts Type A-E. In these embodiments, the OSC isothermal oscillating tests are performed on the aged catalyst Type A-E core samples at a temperature of about 525° C., with a feed of either $O_2$ with a concentration of about 4,000 ppm diluted in inert $N_2$, or CO with a concentration of about 8,000 ppm of CO diluted in inert $N_2$. Further to these embodiments, the OSC isothermal oscillating tests are performed within the proprietary reactor using a SV of about 60,000 hr$^{-1}$, ramping from room temperature to a temperature of about 525° C. under a dry $N_2$ environment. When the temperature of about 525° C. is reached, the OSC isothermal oscillating test is initiated by flowing $O_2$ through the aged catalyst Type A-E core samples within the reactor. After about 240 seconds, the feed flow is switched to CO, thereby allowing CO to flow through the aged catalyst Type A-E core samples within the reactor for about another 240 seconds. The isothermal oscillating condition between CO and $O_2$ flows is enabled for about 4 cycles of about 480 seconds each, respectively.

In these embodiments, $O_2$ and CO are allowed to flow first within an empty test reactor, before the OSC isothermal oscillating test of the aged catalyst Type A-E core samples, in order to establish test reactor benchmarks. Further to these embodiments, the aged catalyst Type A-E core sample under testing is placed within the test reactor and $O_2$ and CO are allowed to flow. In these embodiments, as the aged catalyst Type A-E core sample exhibits OSC, the aged catalyst Type A-E core sample stores $O_2$ when $O_2$ flows. Further to these embodiments, when CO flows there is no $O_2$ flowing and the $O_2$ stored within the aged catalyst Type A-E core sample reacts with the CO to form $CO_2$. Still further to these embodiments, the time during which the aged catalyst Type A-E core sample stores $O_2$ and the time during which CO is oxidized to form $CO_2$ are measured to confirm/verify the OSC performance and aging stability of the aged catalyst Type A-E core samples.

Catalytic Performance of Catalysts Type A-E

In some embodiments, the catalytic performance of the aforementioned aged catalysts Type A-E is assessed using catalyst core samples. In these embodiments, aged catalyst Type A-E core samples are evaluated by performing a series of LO tests to determine the temperature at which 50% conversion ($T_{50}$) and the temperature at which 90% conversion ($T_{90}$) of pollutants including nitrogen oxides ($NO_X$), carbon monoxide (CO), and hydrocarbons (HC) are achieved. Further to these embodiments, $T_{50}$ and $T_{90}$ values achieved per species converted are detailed in Table 2, below.

TABLE 2

T$_{50}$ and T$_{90}$ values for NO$_X$, CO, and HC conversions
calculated from LO tests of aged catalysts Type A-E.

| Catalyst | Composition | T$_{50}$ (° C.) | | | T$_{90}$ (° C.) | | |
|---|---|---|---|---|---|---|---|
| | | NO$_X$ | CO | THC | NO$_X$ | CO | THC |
| Type A | Ce—Fe—Rh | 238.2 | 234.0 | 261.4 | 459.6 | 241.2 | >500 |
| Type B | Ni, La—Fe—Rh | 233.1 | 228.5 | 250.1 | 274.9 | 233.1 | 311.6 |
| Type C | Ni—Fe—Rh | 233.2 | 228.9 | 247.6 | 274.2 | 234.9 | 323.1 |
| Type D | Nd—Fe—Rh | 231.4 | 226.4 | 246.5 | 264.2 | 231.4 | 315.1 |
| Type E | Fe—Rh | 242.0 | 237.8 | 259.5 | 312.4 | 245.6 | 369.3 |

In some embodiments, catalyst Type D (including Nd as a dopant element) exhibits the highest catalytic performance levels associated with significantly low T$_{50}$ temperatures in NO$_X$, CO, and HC conversions. In these embodiments, adding Ni or other dopant elements to the A$_a$Rh$_b$Fe$_c$O$_X$ oxide composition improves the catalytic performance when compared to Ce—Fe—Rh composition (catalyst Type A) or Fe—Rh composition (catalyst Type E).

OSC Property of Catalysts Type A-E

In some embodiments, the OSC property of the aged catalyst Type A-E core samples are evaluated by performing a TWC standard isothermal OSC oscillating test at a temperature of about 525° C. In these embodiments, the OSC property of the aged catalysts Type A-E are determined in terms of O$_2$ delay times in seconds as detailed in Table 3, below.

TABLE 3

O$_2$ delay times associated with aged catalysts Type A-E.

| Catalyst | Composition | O$_2$ Delay Time (s) |
|---|---|---|
| Type A | Ce—Fe—Rh | 8.84 |
| Type B | Ni, La—Fe—Rh | 31.20 |
| Type C | Ni—Fe—Rh | 27.10 |
| Type D | Nd—Fe—Rh | 28.00 |
| Type E | Fe—Rh | 26.10 |

In some embodiments, catalyst Type B (including Ni and La as dopant elements) exhibits the highest OSC property (about 31.2 seconds). In these embodiments, catalysts Type B-E (A$_a$Rh$_b$Fe$_c$O$_X$ oxide composition) exhibit higher OSC property when compared to catalyst Type A (Fe—Rh—Ce composition), thereby achieving improved catalytic performance.

In summary, the catalysts Type A-E exhibit early light-offs than conventional TWC catalysts, thereby improving pollutants (e.g., NO$_X$, CO, HC) emissions conversion efficiency. The aforementioned catalysts Type A-E exhibiting high catalytic performance are produced employing low loadings of Rh, thereby the costs associated with the use of PGM materials within TWC catalysts are reduced. The aforementioned catalysts Type A-E exhibit enhanced OSC property, thereby facilitating a highly significant transport of materials in and out of the Fe-activated Rh catalyst layers and providing improved interactions with conventional and unconventional catalyst supports and additives.

The TWC catalytic material compositions included within cGPF Type A and catalysts Type B-E can be employed for coating any suitable substrate (e.g., wall-flow filter, flow-through monolith) to produce catalytically active TWC substrate as well as provide enhanced particle filtrate efficacy since the catalyst is deposited within the walls of either the monolith or filter substrate.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A coated gasoline particulate filter comprising:
   a substrate,
   a catalytic layer deposited onto the substrate, the catalytic layer comprising
   (i) a composition comprising a platinum group metal, iron, and cerium; or
   (ii) a composition comprising a doped iron-rhodium oxide.

2. The particulate filter of claim 1, wherein the catalytic layer comprises a platinum group metal, iron, and cerium, and the platinum group metal is rhodium.

3. The particulate filter of claim 2, wherein a loading of the rhodium is from about 1 to 100 g/ft$^3$, a loading of the iron is from about 200 to 1,680 g/ft$^3$, and a loading of the cerium is about 200 to 4,200 g/ft$^3$.

4. The particulate filter of claim 2, wherein the catalytic layer further comprises one or more of nickel and a lanthanide selected from the group consisting of yttrium, lanthanum, praseodymium, and neodymium.

5. The particulate filter of claim 1, wherein the catalytic layer comprises a doped iron-rhodium oxide having a formula A$_a$Rh$_b$Fe$_c$Ox with a loading from about 400 to 9,600 g/ft$^3$.

6. The particulate filter of claim 5, wherein a is a value from about 0 to 0.3 mole fraction, b is greater than or equal to about 0.0004 mole fraction, and c is from about 0.69 to about 0.9996 mole fraction.

7. The particulate filter of claim 5, wherein A is selected from the group consisting of zinc, nickel, cobalt, manganese, magnesium, calcium, strontium, yttrium, cerium, lanthanum, praseodymium, neodymium, terbium, ytterbium, gallium, barium, and combinations thereof.

8. The particulate filter of claim 1, wherein the substrate comprises a cordierite wall-flow filter.

9. The particulate filter of claim 1, wherein the substrate comprises a cordierite flow-through monolith.

10. The particulate filter of claim 1, wherein the catalytic layer is deposited onto the substrate by a method selected from the group consisting of co-milling, co-precipitation, nitrate combustion, impregnation, sol-gel, and incipient wetness.

11. The particulate filter of claim 10, wherein the catalytic layer is deposited onto the substrate by an impregnation method.

12. The particulate filter of claim 1, wherein the particulate filter exhibits an increase in back-pressure less than about 5% in comparison to an identical blank filter substrate.

13. A catalytic system for treating an exhaust stream of a combustion engine comprising:
   a combustion engine;
   a close-coupled catalytic converter configured and arranged to accept at least on exhaust stream from said combustion engine, the close-coupled catalytic converter comprising a platinum group metal catalyst; and
   a coated gasoline particulate filter downstream of, and in fluid communication with said close-coupled catalytic converter, the particulate filter comprising a substrate onto which a catalytic layer is deposited, the catalytic layer comprising (i) a composition comprising a platinum group metal, iron, and cerium; or (ii) a composition comprising a doped iron-rhodium oxide; and wherein the catalytic system exhibits a comparable reduction in tailpipe emissions of $NO_x$, CO, THC, and NMHC in comparison to a similar system having an underfloor catalytic converter comprising a platinum group metal catalyst as a downstream converter.

14. The catalytic system of claim 13, wherein the catalytic layer comprises a composition comprising rhodium, iron, and cerium.

15. The catalytic system of claim 14, wherein a loading of the rhodium is from about 1 to 100 g/ft$^3$, a loading of the iron is from about 200 to 1,680 g/ft$^3$, and a loading of the cerium is about 200 to 4,200 g/ft$^3$.

16. The catalytic system of claim 14, wherein the catalytic layer further comprises one or more of nickel and a lanthanide selected from the group consisting of yttrium, lanthanum, praseodymium, and neodymium.

17. The catalytic system of claim 13, wherein the catalytic layer comprises a doped iron-rhodium oxide system having the formula $A_a Rh_b Fe_c Ox$ with a loading from about 400 to 9,600 g/ft$^3$.

18. The catalytic system of claim 17, wherein a is a value from about 0 to 0.3 mole fraction, b is greater than or equal to about 0.0004 mole fraction, and c is from about 0.69 to about 0.9996 mole fraction.

19. The catalytic system of claim 17, wherein A is selected from the group consisting of zinc, nickel, cobalt, manganese, magnesium, calcium, strontium, yttrium, cerium, lanthanum, praseodymium, neodymium, terbium, ytterbium, gallium, barium, and combinations thereof.

20. A catalytic system for treating an exhaust stream of a combustion engine comprising:

a combustion engine;

a coated gasoline particulate filter configured and arranged to accept at least on exhaust stream from said combustion engine, the coated gasoline particulate filter comprising a substrate onto which a catalytic layer is deposited, the catalytic layer comprising (i) a composition comprising a platinum group metal, iron, and cerium; or (ii) a composition comprising a doped iron-rhodium oxide system.

21. A catalyst comprising a cordierite flow-through monolith substrate;

a catalytic layer deposited onto the substrate, the catalytic layer comprising a doped iron-rhodium oxide catalyst composition having the formula $A_a Rh_b Fe_c Ox$, wherein a is a value from about 0 to 0.3 mole fraction, b is greater than or equal to about 0.0004 mole fraction, and c is from about 0.69 to about 0.9996 mole fraction, and A is selected from the group consisting of zinc, nickel, cobalt, manganese, magnesium, calcium, strontium, yttrium, cerium, lanthanum, praseodymium, neodymium, terbium, ytterbium, gallium, and barium, and wherein the loading of the catalyst composition on the substrate is from about 5 to 120 moles/ft$^3$, and the catalyst exhibits $T_{50}$ conversion temperatures for NOx and CO less than 245° C., and a $T_{50}$ conversion temperatures for THC less than 262° C.

22. The catalyst of claim 21, wherein the catalyst exhibits an $O_2$ delay time that is between about 26 and 31 seconds.

23. The catalyst of claim 21, wherein a is a value from about 0.01 to 0.3 mole fraction, and wherein b is a value from about 0.002 to 0.01 mole fraction.

24. The catalyst of claim 21, wherein a is a value from about 0.05 to 0.2 mole fraction.

25. The catalyst of claim 21, wherein A is nickel, lanthanum, or a combination thereof.

* * * * *